United States Patent
Miller

(10) Patent No.: US 6,582,608 B1
(45) Date of Patent: Jun. 24, 2003

(54) SYSTEM FOR THE REMOVAL OF ORGANIC CONTAMINANTS FROM WATER, AIR AND SOIL

(75) Inventor: Gerald W. Miller, Cincinnati, OH (US)

(73) Assignee: Hitech Polymers Inc., Cincinnati, OH (US)

( * ) Notice: Subject to any disclaimer, the term of this patent is extended or adjusted under 35 U.S.C. 154(b) by 0 days.

(21) Appl. No.: 08/265,267

(22) Filed: Jul. 1, 1994

(51) Int. Cl.⁷ .................................................. C02F 1/28
(52) U.S. Cl. .......................... 210/668; 95/143; 134/7; 210/669; 210/680; 210/693
(58) Field of Search ..................... 134/7; 208/391; 210/668, 669, 680, 693, 760, 924, 679, 692; 95/143

(56) References Cited

U.S. PATENT DOCUMENTS

| | | | |
|---|---|---|---|
| 3,518,183 A | | 6/1970 | Evans .......................... 210/693 |
| 3,819,514 A | * | 6/1974 | Clampitt et al. ............. 210/693 |
| 3,929,631 A | | 12/1975 | Winkler ....................... 210/693 |
| 4,061,573 A | * | 12/1977 | Biron .......................... 210/924 |
| 4,082,660 A | | 4/1978 | Papirer et al. ................ 210/693 |
| 4,167,973 A | | 9/1979 | Forte et al. .................. 210/764 |
| 4,420,573 A | | 12/1983 | Fogg et al. .................. 523/333 |
| 4,801,386 A | * | 1/1989 | Sugimori et al. ............ 210/680 |
| 4,929,341 A | * | 5/1990 | Thirumalachar et al. .... 208/391 |
| 4,941,978 A | | 7/1990 | Gabrick ....................... 210/693 |
| 5,019,245 A | * | 5/1991 | Ignasiak et al. ................ 134/7 |
| 5,104,548 A | * | 4/1992 | Gabrick ....................... 210/924 |

FOREIGN PATENT DOCUMENTS

EP    0518336    12/1992

OTHER PUBLICATIONS

Japanese Abstract No. 159155 dated Aug. 2, 1978.
Japanese Abstract No. 135702 dated Jun. 1, 1978.
USSR Abstract No. 789329 dated Apr. 23, 1987.

* cited by examiner

Primary Examiner—Ivars Cintins
(74) Attorney, Agent, or Firm—Nixon & Vanderhye P.C.

(57) ABSTRACT

Discrete non-clumping mechanically stable geometric alloyed material shapes having about 55–95% by weight thermoplastic elastomer and about 5–45% thermoplastic polymer and about 0–12% by weight filler are used for removing organic contaminates from contaminated fluids. The shapes are typically spheres having a maximum dimension of 0.125 inches, or circular discs having a thickness of less than 6 millimeters. The shapes are put in a loose form or packing, and a fluid containing organic contaminants (such as water, air, or a soil slurry) is brought into contact with the shapes so that the shapes absorb organic contaminants from the fluid, typically absorbing more than 90% of the contaminants in the first pass through. The contaminated fluid is typically passed through an ozone generator before being brought into contact with the shapes. The shapes may be foamed, e.g. utilizing about 0.1–10% by weight foaming agent. The invention allows removal of organic contaminants to ppm levels from very large loadings, such as crude contaminated water, fuel-containing soil, and open air spills of organic solvents.

19 Claims, 3 Drawing Sheets

SYSTEM FOR THE REMOVAL OF ORGANIC CONTAMINANTS FROM WATER, AIR AND SOIL

BACKGROUND AND SUMMARY OF THE INVENTION

The invention relates to a method and composition of matter for removing organic contaminants from fluids, such as liquids, gases, or the like, and is particularly suitable for decontaminating water, air, and soil.

There are increasing volumes of organic liquids that are used throughout the world in the form of fuels, lubricants, chemicals, food additives, and the like which contaminate the air, water and soil. The practices of burying organic materials, dumping waste products at sea, venting effluent gases to the atmosphere, filling automobiles with gasoline, disposing of spent fuels, and the like, for the last fifty years have created dangerous levels of contamination in both isolated and populated areas. Oil refineries continuously emit hydrocarbon vapors to the air, and oil spills at sea and accidents on land have taken a substantial environmental toll.

A variety of techniques, and variety of proposals, have been used and made in the past for cleaning up or containing contaminants. For example, diatomaceous earth (e.g. kitty litter) has been used to absorb small spills in garages, manufacturing plants, and commercial operations. Mats have been fabricated from polyolefin fibers, such as polypropylene, and have been used to pick up crude spills from water. Booms have been used to contain spills so that beaches and natural habitats are not endangered. Also—such as shown in U.S. Pat. No. 4,941,978—granulated elastomeric gums (such as block copolymers of ethylenelbutylene and styrene) have been used to absorb oil spills.

The techniques utilized in, and contemplated by, in prior art have had varying degrees of effectiveness and versatility. Where large volumes of contaminated fluid are to be treated, there are oftentimes difficulties in the treatment material clumping up, or congealing, causing clogging of the treatment vessel or column.

According to the present invention a method of removing organic contaminants from contaminated liquid, gas, soil, or mixtures thereof is provided, as well as a discrete non-clumping mechanically stable geometric alloyed material shape, which is relatively simple to practice or manufacture, versatile, and effective. The shapes produced according to the present invention are non-clumping and mechanically stable, and are capable of removing at least about 90% of the contaminants in a first pass of contaminated fluid through a column of the shapes.

The method of the present invention is used in the direct removal of organic and bacterial contaminants from waste streams of water, oil, soil and mixtures thereof. Typically the waste stream is passed through an ozone generator which removes bacterial and heavy oil contaminants, followed by passing the stream through a fixed bed of organic polymer which sorbs all of the residual organic contaminant. The organic polymer is a polymer blend of a thermoplastic polymer such as a polystyrene, a copolymer of polystyrene/butadiene, and a filler (salt) such as a magnesium oxide. The organic polymer blend is a thermoplastic composition that can be formed in stable geometric shapes which enhance absorption of organic contaminants, such as spherical foamed particles of between 0.02–0.125 inches in diameter, or discs having a maximum dimension of about 0.5 cm, and a thickness of about 0.01–6 mm.

The polymer material readily sorbs and holds organic vapors and liquids. Further, the specific compositions according to the invention have increased mechanical stability compared to the prior art, so as to not collapse or congeal (clump) during the sorption process. The compositions of the invention have reduced costs as polymer blends, they can be fabricated into different desired specific geometries, they sorb hydrocarbons quickly, and they have high sorption levels.

According to one aspect of the present invention a method of removing organic contaminants from contaminated liquid, gas, soil, or mixtures thereof is provided which comprises the following steps: (a) Producing discrete non-clumping mechanically stable geometric shapes of a blend of elastomeric material with about 5–45% by weight thermoplastic polymer. (b) Providing the shapes in a loose form or packing, And, (c) bringing a fluid containing organic contaminants into contact with the shapes in loose form or packing so that the shapes absorb organic contaminants from the fluid.

Step (a) is preferably practiced by blending and alloying as an elastomeric material polystyrene-butadiene copolymers, polystyrene-butadiene-polystyrene triblock copolymers, polystyrene-isoprene-polystyrene triblock copolymers, polystyrene grafts of elastomers, or mixtures thereof with about 5–45% by weight as the thermoplastic polymer polystyrene, a polyolefin, or mixtures thereof. Step (a) is typically also further practiced by blending and alloying about 4–12% by weight of a filler (typically MgO, although other carbonates, oxides or hydroxides of calcium or magnesium can be used, as well as talc, silica, diatomaceous earth, or mixtures thereof) with the elastomeric material and thermoplastic polymer. Typically about 0.1–10% (e.g. 0.5–2%) foaming agent is used with the material to produce foamed shapes.

Typically the method includes the further step, prior to step (c), of passing the contaminated fluid through an ozone generator. Step (b) is typically practiced by forming a column of geometric shapes and passing a stream of contaminated fluid through the column. Once the geometric shapes in the column become saturated with organic contaminant, they are replaced.

Step (a) may be practiced to produce disc shaped geometric shapes having a maximum dimension of about 0.5 centimeters and a thickness of about 0.01–6 millimeters. Alternatively, step (a) may be practiced to produce spherical shapes having a diameter of less than about 1.25 inches (e.g. between about 0.02–0.125 inches). Step (b) is typically practiced so as to remove at least about 90% of the contaminants in a first pass of the contaminated fluid through the column.

Where soil is contaminated, there may be the further steps of flooding the contaminated soil with water and retrieving the water. Then step (c) is practiced by passing the retrieved water through the column.

The invention also relates to a discrete non-clumping mechanically stable geometric alloyed material shape. The shape consists essentially of about 55–95% by weight thermoplastic elastomer, about 5–45% thermoplastic polymer, and about 0–12% filler. Preferably about 4–12% filler and about 6–25% thermoplastic polymer are utilized. The shape may be foamed (e.g. by using about 0.1–10% by weight foaming agent).

The shape according to the invention is preferably spherical with a maximum diameter of about 1.25 inches, or a circular disc having a thickness of about 0.1–6 millimeters.

When foamed, the shapes typically have a closed cell foam construction. The fillers, elastomeric material, and thermoplastic polymer that may be utilized are as described above.

It is the primary object of the present invention to provide a method of removing organic contaminants from contaminated fluids in an effective manner, and discrete shapes which may be cost effectively produced and are well suited for use in the method of the invention. This and other objects of the invention will become clear from an inspection of the detailed description of the invention, and from the appended claims.

DETAILED DESCRIPTION OF THE DRAWINGS

Figure 2:
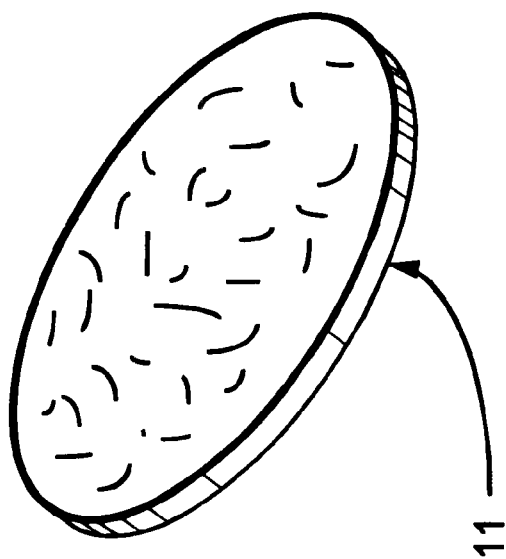
FIG. 2 is a schematic perspective view of a circular disc shape according to the present invention.

The process of the present invention includes the use of specific polymer compositions [typically in addition to ozone treatment] having polymer material with the ability to readily sorb and hold organic vapors and liquids. Further, the compositions described herein have increased mechanical stability so as not to collapse or congeal during the sorption process; they have reduced costs as polymer blends; they can be fabricated into specific geometries; they sorb hydrocarbons quickly; and they have high sorption levels.

The ozone treatment of oil or hydrocarbon is primarily used for reducing the level of non-hydrocarbon moieties, but can affect some organic contaminants in air or water. The conditions for ozonolysis will determine the effect of such a treatment. Many of these reactions are described in basic organic chemistry textbooks, e.g., ORGANIC CHEMISTRY, Morrison and Boyd, Allyn & Bacon, 1962.

The polymeric material, to function properly for sorption of hydrocarbons for either air or water streams, must exhibit good mechanical stability, i.e., the polymer particles must not congeal in a solid mass to clog the vessel through which the air or water stream passes. Powdered materials tend to clog vessels, whereas discrete particles of geometric shape of mechanically stable polymer do not congeal (clump) nor clog, Mechanical stability is required also for storage stability and handling of the polymer for filling, The alloying of elastomers can result in increased mechanical and thermal stability over handling other elastomer materials. Filled alloys are also beneficial mechanically and through sorption.

The ability to alloy thermoplastic polymers with elastomers will result in a less costly product. Elastomers are usually in the range of one dollar or more/pound, whereas thermoplastic polymers, particularly the commodity polystyrene and polyolefin polymers, are less than half the price of the elastomers. The addition of commodity fillers with the thermoplastic polymers can reduce the cost even further.

The ability to alloy thermoplastic polymers with elastomers provides a rheological behavior that is improved over the elastomer alone, in that the extrudate has a broader processing range, allowing the fabrication of preferred geometrical shapes from extrusion. Spherical and disc-shaped pellets are preferred for sorption of organic contaminants with high surface areas. These geometries, at very small dimensions, are preferred to powders. Further, these geometries can be made at controlled sizes.

The sorption of hydrocarbons by the polymeric alloys of this invention proceeds at different rates and to different levels, regulated by the specific alloy. The ability to readily make foamed, small, discrete spheres or discs, is afforded by the use of polymer alloys, whereas the elastomer itself is not easily made in selected shapes and foams, providing preferred sorption levels. The formation of foamed geometries in the sorbing polymer alloys increases the ability of the polymer to sorb greater amounts of organic contaminant as well as increase the rate at which the organic contaminant is sorbed.

The polymer compositions according to the invention are alloys of thermoplastic elastomers. These elastomers are made from the copolymerization of styrene and butadiene, styrene and isoprene, and styrene grafted to various elastomers. The thermoplastic polymers which can be alloyed with the aforementioned elastomers are polystyrene, polyethylene, polypropylene and their copolymers.

Inorganic fillers may be blended with the polymer alloys, to include talc, diatomaceous earth, silica and the like. Functional salts may be used, such as the carbonates, oxides and hydroxides of calcium and magnesium, with MgO preferred.

Figure 1:
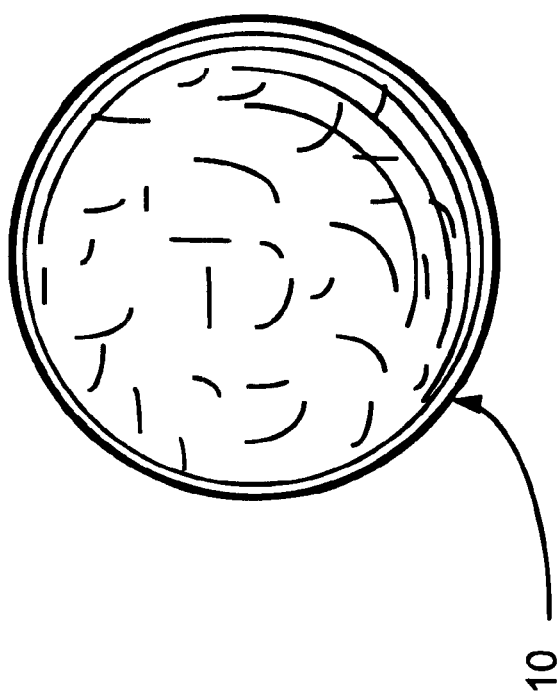
FIG. 1 is a schematic view of an exemplary spherical shape according to the present invention.

FIG. 1 illustrates an exemplary shape 10 which is produced according to the present invention. The shape 10 is generally spherical, and typically has a diameter less than about 0.125 inches (typically between about 0.02–0.125 inches). It has a relatively rough surface, and if foamed typically has a closed cell foam construction.

FIG. 2 illustrates an alternative shape 11, in this case a generally circular disc shape. The disc 11 typically has a maximum dimension (e.g. diameter) of about 0.5 centimeters, and is thin, typically having a thickness of about 0.01–6 millimeters. The discs 11 typically are formed by controlling the cutting and extrusion rate of multiple polymer compositions. A single screw extruder may be utilized, although other apparatus is also suitable.

Figure 3:
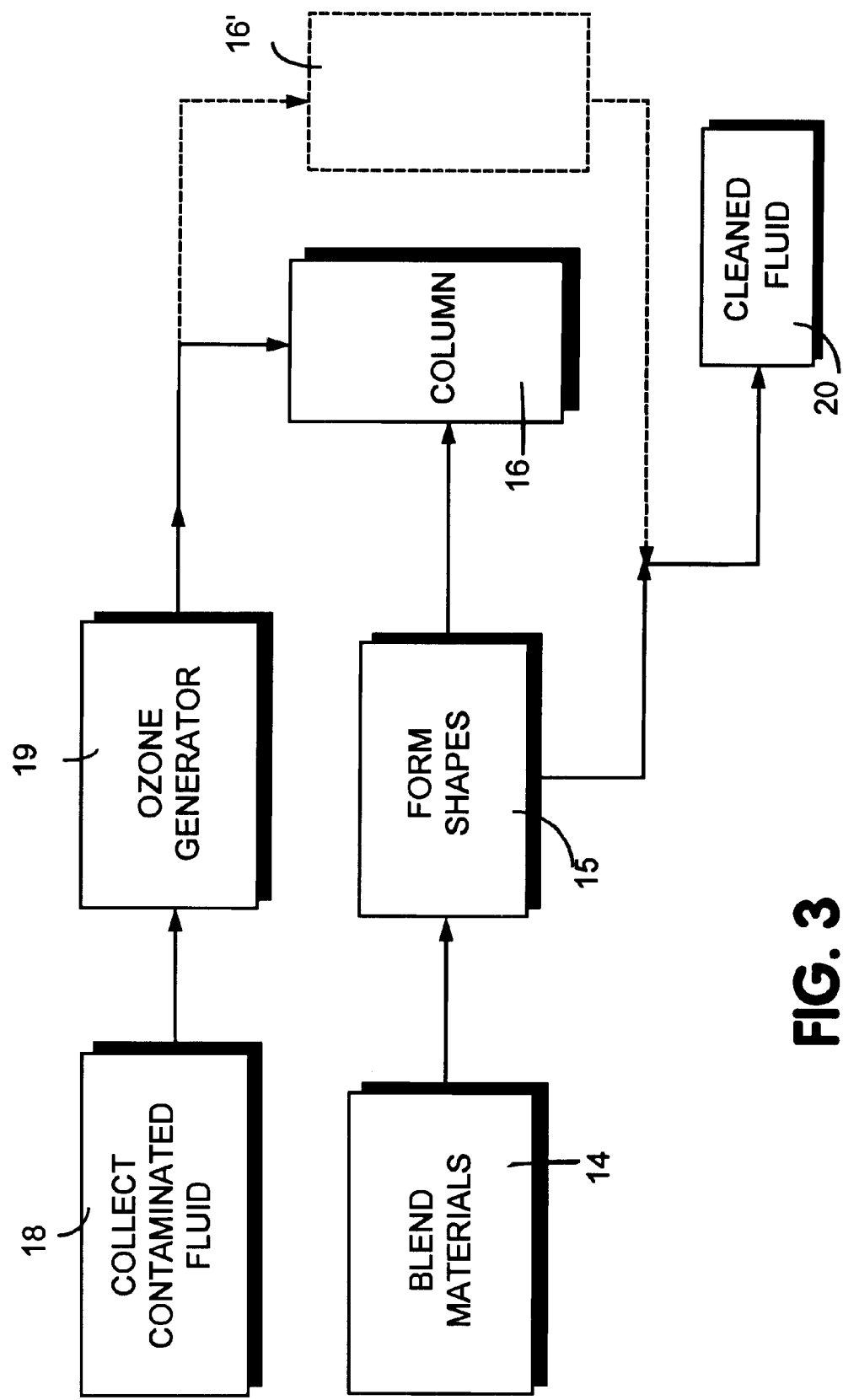
FIG. 3 is a schematic showing of the practice of an exemplary method according to the present invention.

FIG. 3 schematically illustrates the method according to the present invention. As indicated schematically in box 14, blends of about 55–95% by weight thermoplastic elastomer, about 5–45% (preferably about 6–25%) thermoplastic polymer, and about 0–12% (preferably about 4–12%) filler. A foaming agent, typically about 0.1–10% by weight (preferably about 0.5–2%) may also be blended with the materials in 14. From the blended materials the shapes 10, 11, are formed, as indicated schematically at 15 in FIG. 3, e.g. by using a single screw extruder and thinly cutting the extruded blend. The shapes are then provided in a loose form, or packing, such as in column 16.

In the practice of the method of the present invention, contaminated fluid is collected, as indicated schematically by box 18 in FIG. 3. For example, collection may be by vacuum, a boom, pumping, positive air pressure, or the like. The contaminated fluid may comprise a gas, a liquid, a slurry, or the like. The organic contaminants typically include oil and other hydrocarbons, and it is preferred that the collected contaminated fluid first pass through an ozone generator 19, as is conventional per se. Then from the ozone generator 19 the contaminated fluid is brought into contact with the shapes 10, 11 in the column 16, as indicated in FIG. 3. In a single pass through the column 16 at least about 90% of the organic contaminants are removed by sorption. Once the shapes become saturated with organic contaminants the column 16 is emptied and new shapes put into place. In order that the process be continuous, one or more alternative columns 16' can also be provided valved with the column 16 so that while one is being cleaned the other is operational. Ultimately the cleaned fluid is produced, as indicated at 20 in FIG. 3.

The motive force for drawing the contaminated fluid through the column 16 may be a liquid head, a pump on either the upstream or downstream ends of the column, a blower on either the upstream or downstream ends of the columns, or gravity.

Where soil has been contaminated, one effective technique is to flood the contaminated soil with water, and then collect the water (e.g. by suction), which contaminated water is then used as the fluid as indicated in box 18. Alternatively, other mechanisms may be used to bring the fluid containing organic contaminants into contact with the shapes, such as by dispersing the shapes 10, 11 over the surface of a contaminated body of water (e.g., for example, if there is an oil spill in a harbor), or the contaminated fluid shapes may be pumped together through a common line and then separated by a screen or filter, etc.

Non-limiting examples of shapes that can be produced by particular blends according to the present invention are as follows:

EXAMPLE I

A blend of 20 parts (weight percent) of polyethylene with a melt flow index of 0.25 g/10 min, density of 0.952 g/cc, and 80 parts (weight percent) of a 28/72 polystyrene/butadiene copolymer (Polymer A) with random block structure was alloyed in a ZSK twin screw extruder with underwater pelletizing, yielding spherical pellets (10) having a diameter of less than 0.125 inches. These pellets were subject to immersion in Diesel Fuel per ASTM F726. A 50 g, sample absorbed 19 g, of Diesel Fuel.

ASTM F726 is a laboratory test to describe the performance of adsorbents in removing nonemulsified oils and other immiscible liquids from the surface of water. The test consists in placing a layer of adsorbent in a mesh basket to a depth of 2 cm., weighing the sorbent, and fully immersing in a medium oil (SAE 20N20 non-detergent motor oil) until full saturation has occurred. The sample is removed from the oil bath, drained for about 30 seconds, and weighed.

EXAMPLE II

Mixtures of 20% polystyrene and 80% Polymer A were prepared as were those of 20% polypropylene and 80% Polymer A by the same method as in Example I. Each of these alloys had sorbed 21 g of Diesel Fuel per ASTM F726.

EXAMPLE III

A 50 g, sample of the 28/72 polystyrene/butadiene copolymer was prepared as in Example I without an alloy component, and it absorbed 21 g, of Diesel Fuel.

EXAMPLE IV

A mixture of polystyrene, styrene/butadiene copolymer and magnesium oxide was compounded in a ZSK twin screw extruder with underwater pelletizing, yielding spheroidal pellets. Four similar materials were extruded, wherein the content of magnesium oxide, styrene/butadiene copolymer and polystyrene were as listed in Table A. The uptake of Diesel Fuel for a 50 g, polymer sample is also listed in Table A.

TABLE A

| Polymer A, % | Polystyrene, % | Magnesium Oxide, % | Uptake, Diesel Fuel |
|---|---|---|---|
| 100 | 0 | 0 | 21 g. |
| 90 | 6 | 4 | 21 g. |
| 80 | 12 | 8 | 21 g. |
| 70 | 18 | 12 | 21 g. |

EXAMPLE V

A mixture of about 70% Polymer A, about 18% polystyrene, and about 12% magnesium oxide was compounded as in Example 4, and a foaming agent (about 1% azodicarbodiimide blowing agent) was added to produce foamed spherical pellets less than 0.125 inches in diameter. These foamed pellets were found to absorb 36 g, of Diesel Fuel per 50 g, of pellets per ASTM F726.

EXAMPLE VI

A mixture of 80 parts styrene/isoprene/styrene triblock elastomer and 20 parts of polystyrene were compounded as in Example I. These pellets sorbed 23 g, Diesel Fuel oil per 50 g, sample.

EXAMPLE VII

A mixture of 80 parts styrene/butadiene/styrene triblock elastomer and 20 parts of polystyrene were compounded as in Example I. These pellets sorbed 19 g, Diesel Fuel oil per 50 g, sample.

Except for the foamed pellets, all of the alloys with styrene/butadiene or styrene/isoprene copolymer absorbed equivalent amounts of Diesel Fuel to the elastomer as the 100% component. This is tabulated in Table B.

TABLE B

| SAMPLE COMPOSITION | g. fuel/ 50 g. polymer |
|---|---|
| 20/80 Polystyrene/styrene-butadiene copolymer | 21 |
| 20/80 Polyethylene/styrene-butadiene copolymer | 19 |
| 20/80 Polypropylene/styrene-butadiene copolymer | 21 |
| 20/80 Polystyrene/styrene-butadiene-styrene triblock | 18 |
| 20/80 Polystyrene/styrene-isoprene-styrene triblock | 23 |
| 100 Polystyrene-butadiene copolymer | 21 |
| 70/18/12 Polystyrene-butadiene/polystyrene/MgO | 21 |
| 70/18/12 Polystyrene-butadiene/polystyrene/MgO/Foam | 36 |

It is important to know the time that a sorbent will hold a volatile organic contaminant before "breakthrough". This can be determined by sending an airstream with an organic contaminant through columns (e.g. column 16 in FIG. 3) containing pelletized compositions from this invention and measuring the effluent as a function of time. The more contaminant which moves through the column without being retained, the earlier the breakthrough.

A stream of 3500 ppm of benzene in air was passed through a 10 g, bed of polymer alloy disc shaped pellets (11) in a tube of 0.5 inch diameter, and the effluent was measured on a time basis to illustrate the difference in rate of uptake of the benzene by the polymer composition. The results in Table C show that the 70/18/12 alloy is comparable to 100% styrene/butadiene polymer, whereas the foamed material from 70/18/12 composition was clearly superior to all other alloys listed.

TABLE C

Time to Breakthrough for Benzene in Air*

| Composition | Time, min |
| --- | --- |
| 20/80 Polystyrene/Polystyrene-butadiene | 8 |
| 20/80 Polyethylene/Polystyrene-butadiene | 10 |
| 20/80 Polypropylene/Polystyrene-butadiene | 5 |
| 20/80 Polystyrene/styrene-butadiene-styrene triblock | 7 |
| 100 Polystyrene-butadiene copolymer | 26 |
| 70/18/12 Polystyrene-butadiene/Polystyrene/MgO | 21 |
| 70/18/12 Polystyrene-butadiene/Polystyrene/MgO; Foamed | >60 |

*Breakthrough was measured as the time to constant exhaust level.

Figure 4:
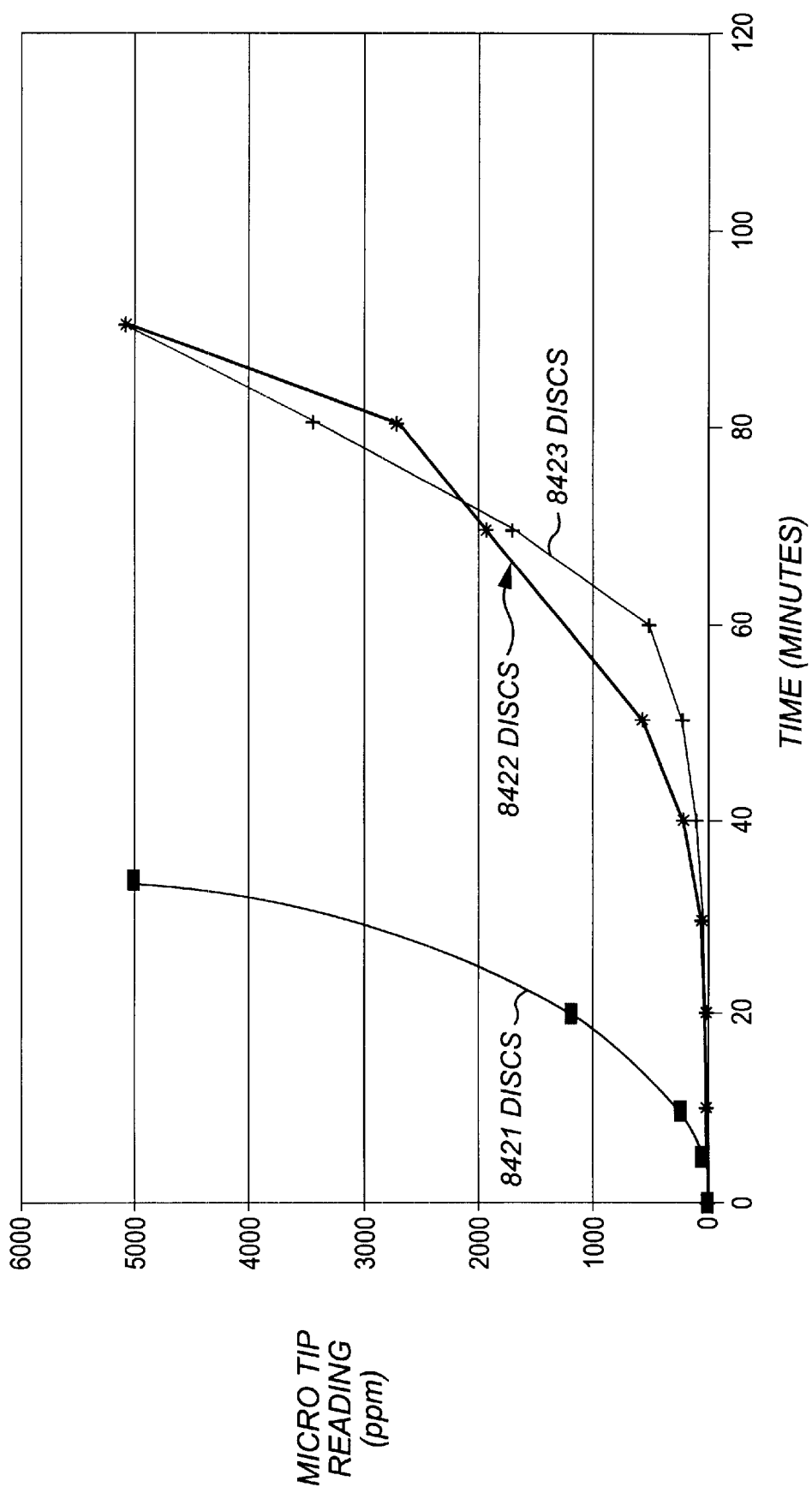
FIG. 4 is a graphical representation illustrating the performance of various blends according to the invention.

The breakthrough of benzene in a water saturated air stream, containing 5000 ppm of benzene, was measured for the 70/18/12 Polystyrene-butadiene/polystyrene/MgO compositions. Composition 8421 was the composition in solid form, whereas 8422 and 8423 were foamed versions of 8421, using 0.5% foaming agent and 1% foaming agent by weight, respectively. The results of breakthrough testing, as shown in FIG. 4, demonstrate that the foamed disc shaped pellet versions were about three times more effective in containing the contaminant benzene than the solid disc shaped pellets.

As indicated above, the elastomeric material is preferably polystyrene-butadiene copolymers, polystyrene-butadiene-polystyrene triblock copolymers, polystyrene-isoprene-polystyrene triblock copolymers, polystyrene grafts of elastomers, and mixtures thereof. The thermoplastic polymer preferably comprises polystyrene, a polyolefin, or mixtures thereof. The filler preferably comprises MgO, and may comprise other carbonates, oxides or hydroxides of calcium or magnesium, talc, silica, diatomaceous earth, or mixtures thereof. While about 0.1–10% by weight foaming agent may be utilized for processing, preferably about 0.5–2% is utilized.

It will thus be seen that according to the present invention advantageous discrete non-clumping mechanically stable geometric alloyed material shapes (microshapes), e.g. having a maximum dimension of 0.5 centimeters, are provided, as well as a method of removing organic contaminants from contaminated fluids utilizing such shapes. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent methods and products.

What is claimed is:

1. A method of removing organic contaminants from contaminated liquid, gas, soil in fluid form, or mixtures thereof, comprising the steps of:
    (a) producing discrete non-clumping mechanically stable geometric shapes of a blend of an elastomeric material which includes at least one elastomer selected from the group consisting of polystyrene-butadiene copolymers, polystyrene-butadiene-polystyrene triblock copolymers, polystyrene-isoprene-polystyrene triblock copolymers, and polystyrene grafts of elastomers with about 5–45% by weight of a thermoplastic polymer which is a polystyrene, a polyolefin, or mixtures thereof;
    (b) providing the shapes in a loose form or packing; and
    (c) bringing a fluid containing organic contaminants into contact with the shapes in loose form or packing so that the shapes absorb organic contaminants from the fluid.

2. A method as recited in claim 1 wherein step (a) is further practiced by blending and alloying about 4–12% by weight of a filler with the elastomeric material and thermoplastic polymer.

3. A method as recited in claim 2 wherein step (a) is further practiced using carbonates, oxides or hydroxides of calcium or magnesium, talc, silica, diatomaceous earth, or mixtures thereof as the filler.

4. A method as recited in claim 3 comprising the further step prior to step (c), of passing the contaminated fluid through an ozone generator.

5. A method as recited in claim 1 comprising the further step prior to step (c), of passing the contaminated fluid through an ozone generator.

6. A method as recited in claim 1 wherein step (b) is practiced by forming a column of geometric shapes, and passing a stream of contaminated fluid through the column.

7. A method as recited in claim 6 comprising the further step of replacing the geometric shapes in the column once saturated with organic contaminant.

8. A method as recited in claim 6 wherein step (b) is practiced to remove at least about 90% of the organic contaminants in a first pass of the contaminated fluid through the column.

9. A method as recited in claim 1 wherein step (a) is further practiced by blending about 0.1–10% by weight foaming agent with the elastomeric material and thermoplastic polymer to produce foamed shapes.

10. A method as recited in claim 1 wherein step (b) is practiced by forming a column of geometric shapes, and passing a stream of contaminated fluid through the column.

11. A method as recited in claim 10 wherein step (b) is practiced to remove at least about 90% of the organic contaminants in a first pass of the contaminated fluid through the column.

12. A method as recited in claim 1 comprising the further step of flooding contaminated soil with water, and retrieving the water; and wherein step (c) is practiced by passing the retrieved water through a column of the geometric shapes.

13. A method as recited in claim 1 wherein step (a) is practiced by using a blend of elastomeric material with about 6–25% by weight thermoplastic polymer.

14. A method of removing organic contaminants from contaminated liquid, gas, soil in fluid form, or mixtures thereof, comprising the steps of:
    (a) producing discrete non-clumping mechanically stable geometric shapes of a blend of elastomeric material with about 5–45% by weight thermoplastic polymer;
    (b) providing the shapes in a loose form or packing; and
    (c) bringing a fluid containing organic contaminants into contact with the shapes in loose form or packing so that the shapes absorb organic contaminants from the fluid, wherein
        step (a) is further practiced by blending about 0.1–10% by weight foaming agent with the elastomeric material and thermoplastic polymer to produce foamed shapes.

15. A method as recited in claim 14 wherein step (a) is further practiced to produce disc-shaped geometric shapes having a maximum dimension of about 0.5 cm, and a thickness of about 0.01–6 mm.

16. A method as recited in claim 14 wherein step (a) is further practiced to produce spherical shapes having a diameter of less than about 0.125 inches.

17. A method of removing organic contaminants from contaminated liquid, gas, soil in fluid form, or mixtures thereof, comprising the steps of:
  (a) producing discrete non-clumping mechanically stable geometric shapes of a blend of elastomeric material with about 5–45% by weight thermoplastic polymer;
  (b) providing the shapes in a loose form or packing; and
  (c) bringing a fluid containing organic contaminants into contact with the shapes in loose form or packing so that the shapes absorb organic contaminants from the fluid, and
  (d) flooding contaminated soil with water, and retrieving the water; and wherein
    step (c) is practiced by passing the retrieved water through a column of the geometric shapes.

18. A method of removing organic contaminants from contaminated liquid, gas, soil, in fluid form, or mixtures thereof, comprising the steps of:
  (a) producing discrete non-clumping mechanically stable geometric shapes of a blend of elastomeric material with about 5–45% by weight thermoplastic polymer;
  (b) providing the shapes in a loose form or packing; and
  (c) bringing a fluid containing organic contaminants into contact with the shapes in loose form or packing so that the shapes absorb organic contaminants from the fluid, wherein
    step (a) is further practiced to produce disc-shaped geometric shapes having a maximum dimension of about 0.5 cm, and a thickness of about 0.01–6 mm.

19. A method of removing organic contaminants from contaminated liquid, gas, soil in fluid form, or mixtures thereof, comprising the steps of:
  (a) producing discrete non-clumping mechanically stable geometric shapes of a blend of elastomeric material with about 5–45% by weight thermoplastic polymer;
  (b) providing the shapes in a loose form or packing; and
  (c) bringing a fluid containing organic contaminants into contact with the shapes in loose form or packing so that the shapes absorb organic contaminants from the fluid, wherein
    step (a) is further practiced to produce spherical shapes having a diameter of less than about 0.125 inches.

* * * * *